US012809393B2

(12) United States Patent
Lo et al.

(10) Patent No.: US 12,809,393 B2
(45) Date of Patent: Nov. 24, 2026

(54) FLYING APPARATUS AND CONTROL METHOD THEREOF

(71) Applicant: INDUSTRIAL TECHNOLOGY RESEARCH INSTITUTE, Hsinchu (TW)

(72) Inventors: Chao-Cheng Lo, Changhua County (TW); Yi-Lun Wen, Taoyuan City (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 22 days.

(21) Appl. No.: 19/185,185

(22) Filed: Apr. 21, 2025

(65) Prior Publication Data

US 2026/0133585 A1 May 14, 2026

(30) Foreign Application Priority Data

Nov. 12, 2024 (TW) ................................ 113143430

(51) Int. Cl.
*G05D 1/617* (2024.01)
*G05D 1/243* (2024.01)
(Continued)

(52) U.S. Cl.
CPC ............ *G05D 1/617* (2024.01); *G05D 1/243* (2024.01); *G05D 2109/254* (2024.01); *G05D 2111/50* (2024.01)

(58) Field of Classification Search
CPC .... G05D 1/0061; G05D 1/0011; G05D 1/617; G05D 1/243; G05D 2109/254; G05D 2111/50; G01C 21/08; B64U 50/13
(Continued)

(56) References Cited

U.S. PATENT DOCUMENTS 9,037,314 B2 5/2015 Waite et al.
11,029,352 B2 6/2021 Blanc-Paques et al.
(Continued)

FOREIGN PATENT DOCUMENTS

CA 3045197 C 5/2023
CN 105912024 B 6/2019
(Continued)

OTHER PUBLICATIONS

Prince E. Kuevor et al., "Fast and Noise-Resilient Magnetic Field Mapping on a Low-Cost UAV Using Gaussian Process Regression," Sensors, Jan. 31, 2023, pp. 1-32, retrieved from https://arxiv.org/pdf/2302.00113.

(Continued)

*Primary Examiner* — Tuan C To
(74) *Attorney, Agent, or Firm* — CKC & Partners Co., LLC

(57) ABSTRACT

A flying apparatus and control method thereof are provided. The flying apparatus obtains magnetic data measured in a time period. The flying apparatus calculates orientations based on the magnetic data. The flying apparatus calculates moving directions based on movement records corresponding to the time period. The flying apparatus compares the orientations and the moving directions to determine whether the flying apparatus has been subject to magnetic interference within the tine period. In response to determining that the flying apparatus has been subject to magnetic interference, the flying apparatus executes an avoidance operation.

20 Claims, 7 Drawing Sheets

(51) Int. Cl.
*G05D 109/25* (2024.01)
*G05D 111/50* (2024.01)

(58) Field of Classification Search
USPC ................................................................ 701/3
See application file for complete search history.

(56) References Cited

U.S. PATENT DOCUMENTS

| | | | | |
|---|---|---|---|---|
| 11,378,982 | B2 | 7/2022 | Wang | |
| 11,874,656 | B2 | 1/2024 | Bethke et al. | |
| 12,405,612 | B2 * | 9/2025 | Itozawa | G05D 1/0223 |
| 2012/0109420 | A1 * | 5/2012 | Lee | G05D 1/0274 701/2 |
| 2016/0334219 | A1 * | 11/2016 | Askarpour | G01C 21/18 |
| 2017/0336806 | A1 | 11/2017 | Blanc-Paques et al. | |
| 2018/0009527 | A1 | 1/2018 | Von Novak, III et al. | |
| 2021/0372793 | A1 | 12/2021 | Nikulin et al. | |
| 2024/0377836 | A1 * | 11/2024 | Shimizu | B60W 50/14 |
| 2025/0054387 | A1 * | 2/2025 | Maruyama | G08G 1/091 |

FOREIGN PATENT DOCUMENTS

| | | | | |
|---|---|---|---|---|
| CN | 110582687 | A | 12/2019 | |
| CN | 112912310 | A | 6/2021 | |
| CN | 117422819 | A | 1/2024 | |
| CN | 118759244 | A | 10/2024 | |
| EP | 3276302 | A1 * | 1/2018 | G01R 33/0035 |
| JP | 2018049000 | A * | 3/2018 | G01R 33/0035 |
| TW | 202311758 | A | 3/2023 | |

OTHER PUBLICATIONS

C. Luo et al., "UAV Position Estimation and Collision Avoidance Using the Extended Kalman Filter," in IEEE Transactions on Vehicular Technology, vol. 62, No. 6, pp. 2749-2762, Jul. 2013.

Mu, Y. et al., "Automatic Detection of Near-Surface Targets for Unmanned Aerial Vehicle (UAV) Magnetic Survey," Remote Sensing, pp. 1-19, Feb. 1, 2020.

Li, Yincheng et al., "A Method for Autonomous Navigation and Positioning of UAV Based on Electric Field Array Detection," Sensors, Feb. 6, 2021, pp. 1-22.

Mark W. Roberson et al., "Quadcopter sensing of magnetic and electric field with geospatial analytics," Proceedings vol. 10645, Geospatial Informatics, Motion Imagery, and Network Analytics VIII; 1064504, 13 pages, Apr. 27, 2018.

Boukabou, Issam et al., "Electric and Magnetic Fields Analysis of the Safety Distance for UAV Inspection around Extra-High Voltage Transmission Lines," Drones, Feb. 2, 2024, pp. 1-20.

Corresponding Taiwan Office Action issued on Jun. 5, 2025. (5 pages).

* cited by examiner

FLYING APPARATUS AND CONTROL METHOD THEREOF

CROSS-REFERENCE TO RELATED APPLICATION

This application claims priority to Taiwan Application Serial Number 113143430, filed Nov. 12, 2024, which is herein incorporated by reference in its entirety.

BACKGROUND

Field of Invention

The present disclosure relates to a flying apparatus and control method thereof. More particularly, the present disclosure relates to a flying apparatus and control method thereof with magnetic interference avoidance function.

Description of Related Art

Bridges are important transportation constructions, and bridge inspections are also an important task in maintaining traffic safety. However, bridge inspections are often restricted by factors such as terrain and industrial safety, and there are many difficulties.

Some existing technologies use drones to inspect bridges. Since drones rely on many electronic components while operating, the high-voltage cables and magnetized steel bars on the bridge may cause magnetic interference to the drones, causing abnormalities in the electronic components. Such situations may lead to the drone being unable to locate, deviating from the course, or even crashing.

In view of this, how to identify magnetic interference and avoid interference sources is the goal that the industry strives to work on.

SUMMARY

The disclosure provides a control method being adapted for use in a flying apparatus, wherein the control method comprises the following steps: obtaining a plurality of first magnetic data measured in a first time period; calculating a plurality of first orientations corresponding to a magnetic pole based on the first magnetic data; calculating a plurality of first moving directions based on a plurality of first movement records corresponding to the first time period; comparing the first orientations and the first moving directions to determine whether the flying apparatus has been subject to magnetic interference within the first time period; and in response to determining that the flying apparatus has been subject to magnetic interference, executing an avoidance operation.

The disclosure further provides a flying apparatus comprising a magnetometer and a processor. The processor is electrically connected to the magnetometer and configured to execute the following operations: receiving a plurality of first magnetic data measured in a first time period from the magnetometer; calculating a plurality of first orientations corresponding to a magnetic pole based on the first magnetic data; calculating a plurality of first moving directions based on a plurality of first movement records corresponding to the first time period; comparing the first orientations and the first moving directions to determine whether the magnetometer has been subject to magnetic interference within the first time period; and in response to determining that the magnetometer has been subject to magnetic interference, executing an avoidance operation.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
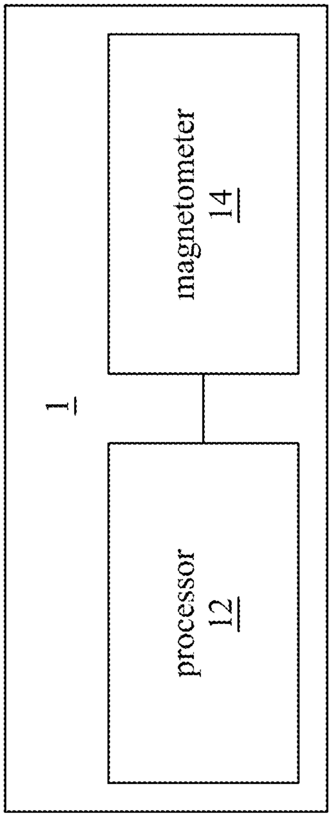
FIG. 1 is a schematic diagram illustrating a flying apparatus according to a first embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

Please refer to FIG. 1, which is a schematic diagram illustrating a flying apparatus 1 according to a first embodiment of the present disclosure. The flying apparatus 1 comprises a processor 12 and a magnetometer 14, wherein the processor 12 is electrically connected to the magnetometer 14. The flying apparatus 1 is configured to detect whether there is any magnetic interference around and avoid the interference source while flying. In some embodiments, the flying apparatus 1 is an unmanned aerial vehicle.

In some embodiments, the processor 12 comprises a central processing unit (CPU), a graphics processing unit (GPU), a microcontroller unit (MCU), a multi-processor, a distributed processing system, an application specific integrated circuit (ASIC), and/or a suitable processing unit.

The magnetometer 14 is configured to measure magnetic data in the environment, wherein the magnetic data comprises multiple magnetic field intensities in multiple directions or a magnetic field sum vector. Accordingly, the flying apparatus 1 is able to determine the orientation of the apparatus based on the magnetic data. In some embodiments, the magnetometer 14 is an electronic compass for the flying apparatus 1 to confirm direction. In some embodiments, the magnetometer 14 is an electronic compass integrated in an inertial measurement unit (IMU).

In order to detect whether there is any magnetic interference around, the processor 12 first calculates multiple orientations corresponding to a magnetic pole based on multiple magnetic data measured in a period of time, wherein the orientations are moving direction of the flying apparatus 1 corresponding to the magnetic field of Earth (e.g., due south, northeast) estimated based on magnetic field directions measured by the magnetometer 14.

It is noted that, since the flying apparatus 1 does not necessarily move in a certain direction of the apparatus (e.g., head towards the front of the vehicle) while flying, the flying apparatus 1 may also fly sideways or backwards. Therefore, the processor 12 calculates the orientations based on magnetic field azimuths measured by the magnetometer 14 and combines with flying control data (e.g., forward, sideways, backward) to determine the orientations of the flying apparatus 1.

Next, the processor 12 then calculates multiple moving directions based on multiple movement records in a period of time (i.e., movement trajectory), wherein the moving directions represent multiple directions of velocities of the flying apparatus 1 at multiple time points within the period of time.

Accordingly, the flying apparatus 1 compares the orientations and the moving directions. Without interference, when the flight direction of flying apparatus 1 changes (namely, the moving directions changes), the orientations calculated based on the magnetometer 14 will also change. Therefore, the angle between the orientations and the moving directions should be maintained at a constant value.

However, if the magnetometer 14 is subject to magnetic interference, even the flying apparatus 1 flies toward a certain direction, the magnetic data measured by the magnetometer 14 will still change constantly due to the interference. Thus, the orientations and the moving directions will not able to be maintained at a constant value.

According to the embodiment above, through comparing the orientations and the moving directions, the flying apparatus 1 provided by the present disclosure is able to determine whether the magnetometer 14 has been subject to magnetic interference within the time period. Furthermore, when the magnetometer 14 has been subject to magnetic interference, the processor 12 controls the flying apparatus 1 to avoid the interference source, e.g., hovering, returning along the original path, bypassing the interference sources, etc.

Specifically, the processor 12 executes the following operations: receiving a plurality of first magnetic data measured in a first time period from the magnetometer; calculating a plurality of first orientations corresponding to a magnetic pole based on the first magnetic data; calculating a plurality of first moving directions based on a plurality of first movement records corresponding to the first time period; comparing the first orientations and the first moving directions to determine whether the magnetometer has been subject to magnetic interference within the first time period; and in response to determining that the magnetometer has been subject to magnetic interference, executing an avoidance operation.

Figure 2:
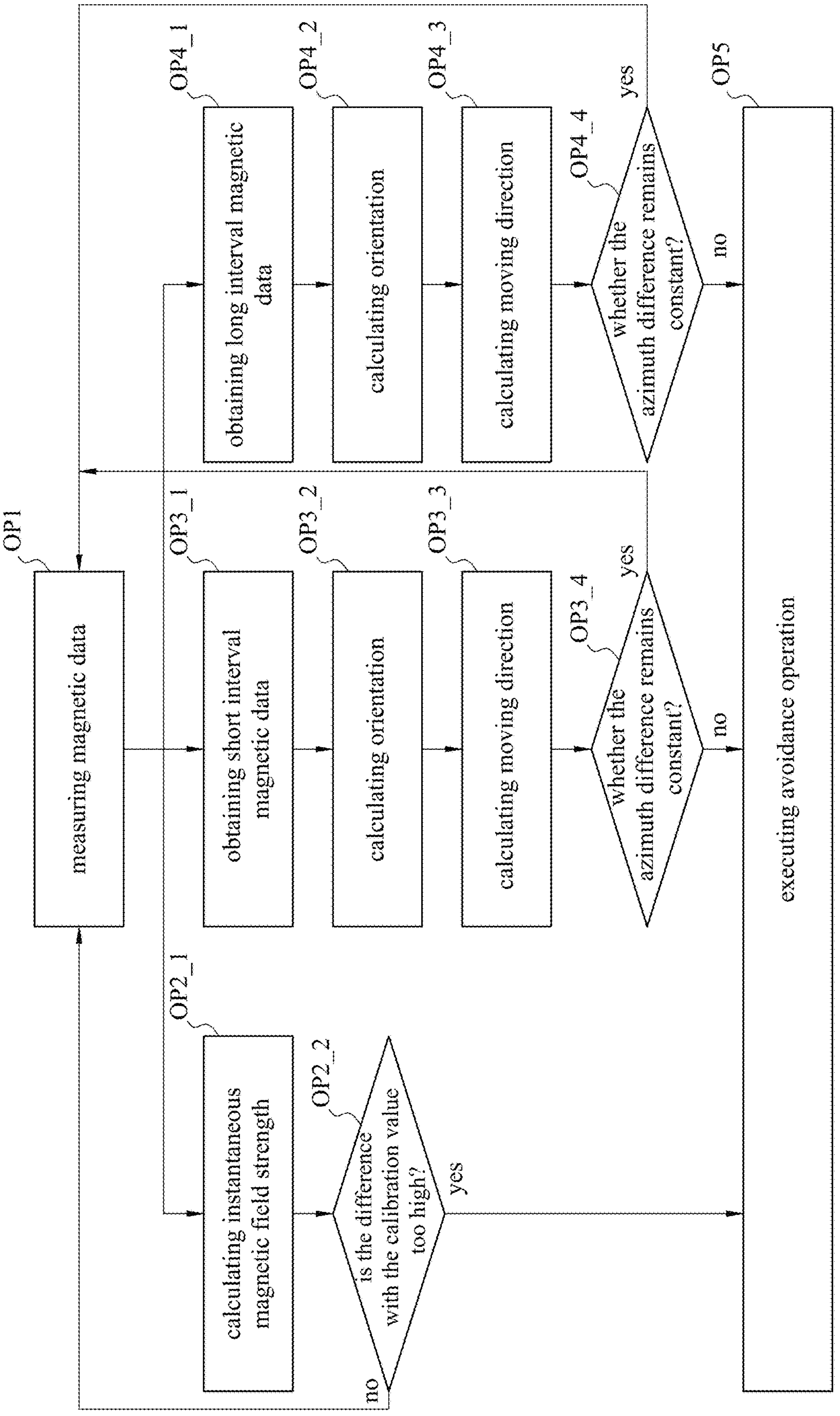
FIG. 2 is a schematic diagram illustrating operations of the flying apparatus determining magnetic interference according to some embodiments of the present disclosure.

In some embodiments, the flying apparatus 1 also determines whether magnetic interference exists by detecting different types of magnetic field changes. In order to illustrate the specific operations of the flying apparatus 1, please refer to FIG. 2, which is a schematic diagram illustrating operations of the flying apparatus 1 determining magnetic interference according to some embodiments of the present disclosure.

First, in operation OP1, the magnetometer 14 measures magnetic data.

Next, in operations OP2_1, OP3_1, and OP4_1, the flying apparatus 1 determines whether it has been subject to magnetic interference based on different types of magnetic field changes within different lengths of time respectively.

First, when the flying apparatus 1 has been subject to magnetic interference, the magnetic field intensities measured by the magnetometer 14 (i.e., the magnetic data) may change and deviate from standard ranges. Accordingly, it may cause the flying apparatus 1 to be unable to determine the correct orientations, or even cause the magnetometer 14 to malfunction. Therefore, in the operations OP2_1 and OP2_2, the flying apparatus 1 continues to determine whether the magnetic data is abnormal to confirm if it is subject to magnetic interference.

In the operation OP2_1, the processor 12 calculates an instantaneous magnetic field intensity based on the magnetic data measured by the magnetometer 14.

Correspondingly, in the operation OP2_2, the processor 12 determines whether the difference between the instantaneous magnetic field intensity and the calibration value is too high, wherein the calibration value is a theoretical value of magnetic field intensity. If the difference is too high, the flying apparatus 1 determines that the magnetometer 14 may have been subject to a strong magnetic interference and further executes the avoidance operation in operation OP5. If the difference does not exceed a certain value, the flying apparatus 1 returns to the operation OP1 and continues to measure magnetic data.

It is noted that, since there are different magnetic field intensities at different locations on Earth, the calibration value needs to be adjusted according to the location of the flying apparatus 1. In some embodiments, the calibration value is obtained after looking up a table based on a positioning location of the flying apparatus 1.

Specifically, the processor 12 is further configured to execute the following operations: calculating a magnetic difference between one of the first magnetic data and a calibration value, wherein the calibration value is generated based on a positioning data of the flying apparatus; and in response to the magnetic difference being greater than a first threshold, determining that the magnetometer has been subject to magnetic interference.

For example, the processor 12 calculates a sum vector of magnetic field intensities in different directions (i.e., vectors) based on the magnetic data measured by the magnetometer 14. Furthermore, the processor 12 takes the numerical part of the sum vector as the instantaneous magnetic field intensity.

Next, the processor 12 determines that the flying apparatus 1 is located in Taiwan, and the magnetic field intensity in this area is 45 μT, thus the processor 12 taking 45 μT as the calibration value.

Finally, while comparing the instantaneous magnetic field intensity and the calibration value, the processor 12 takes 10 percent of the calibration value as a permissible difference. Namely, if the absolute value of the difference between the instantaneous magnetic field intensity and the calibration value exceeds 4.5 μT, the processor 12 determines that the magnetometer 14 has been subject to magnetic interference; otherwise the flying apparatus 1 continues to measure the magnetic data.

On the other hand, while the flying apparatus 1 is subject to strong magnetic interference such as from high voltage cables, the magnetic field directions measured by the magnetometer 14 may be greatly biased in a short time. As a result, it may cause the flying apparatus 1 to become momentarily disoriented and unable to determine the correct direction. Therefore, in operations OP3_1-OP3_4, the flying apparatus 1 determines whether there are abnormal direction changes in the magnetic data in a short period of time (e.g., 1 second) to determine whether it has been subject to magnetic interference.

First, in the operation OP3_1, the processor 12 obtains multiple magnetic data measured at multiple time points within a relatively short time period.

Next, in the operation OP3_2, the processor 12 calculates multiple orientations based on the magnetic data. As mentioned above, the orientations are configured to represent the trends of magnetic field between the time points within the time period.

Next, in the operation OP3_3, the processor 12 calculates multiple the moving directions at multiple time points within the time period. As mentioned above, the moving directions are configured to represent the trends of moving speeds between the time points within the time period.

In some embodiments, the flying apparatus 1 further comprises an accelerometer (not shown in the figures), e.g., the g-sensor in an inertial measurement unit. The accelerometer is electrically connected to the processor 12, and the moving records can be measured and obtained by the accelerometer.

Specifically, the operation of the processor 12 calculating the first orientations further comprises: calculating the first orientations based on a plurality of first accelerations measured by an accelerometer in the first time period.

In some embodiments, the flying apparatus 1 further comprises a positioning unit (not shown in the figures), e.g., a receiver of Global Navigation Satellite System (GNSS). The positioning unit is electrically connected to the processor 12, and the moving records can be measured and obtained from the positioning data of the flying apparatus 1, e.g., obtaining positioning data at multiple time points from Global Navigation Satellite System.

Specifically, the operation of the processor 12 calculating the first orientations further comprises: calculating the first orientations based on a plurality of positioning locations measured by a positioning unit in the first time period.

Next, in the operation OP3_4, the processor 12 compares the orientation and the moving direction at each of the time points and determines whether the azimuth differences in between (i.e., the angle between an orientation and a moving direction) remains constant. If the variations (e.g., differences) between the azimuth differences at the time points are too high, then the processor 12 determines that the magnetometer 14 may have been subject to strong magnetic interference and further executes the avoidance operation in operation OP5. If the variations do not exceed a certain value, the flying apparatus 1 returns to the operation OP1 and continues to measure magnetic data.

In some embodiments, the processor 12 compares two orientations and two moving directions at two different time points and calculates two azimuth differences corresponding to the two time points respectively. If the difference between the two azimuth differences (i.e., the variations) is greater than a second threshold, then the processor 12 determines that the magnetometer 14 has been subject to magnetic interference within the time interval between the two time points.

Specifically, the operation of the processor 12 comparing the first orientations and the first moving directions further comprises: calculating a first azimuth difference and a second azimuth difference between the first orientations and the first moving directions corresponding to a first time point and a second time point based on the first time point and the second time point within the first time period; calculating a first variation between the first azimuth difference and the second azimuth difference; and determining whether the magnetometer has been subject to magnetic interference within the first time period based on the first variation.

In some embodiments, when determining that the variation is greater than the threshold, in order to avoid misjudgments due to error, the processor 12 will further calculates one or more azimuth difference between other time points within the time period and determines whether the corresponding variation is greater than the threshold. As such, the flying apparatus 1 is able to reduce the possibility of misjudgments by a higher determination standard.

Specifically, the operation of the processor 12 comparing the first orientations and the first moving directions further comprises: in response to the first variation being greater than a second threshold, calculating a third azimuth difference between the first orientations and the first moving directions corresponding to a third time point based on the third time point within the first time period; calculating a second variation between the third azimuth difference and the first azimuth difference; and in response to the second variation being greater than the second threshold, determining that the magnetometer has been subject to magnetic interference within the first time period.

On the other hand, when the flying apparatus 1 approaches an interference source with a relatively weak magnetic field strength such as magnetized steel bars, the magnetic field directions measured by the magnetometer 14 may be gradually biased in a relatively long time period. As a result, it may still increase the error of the orientations calculated by the flying apparatus 1 in time. Therefore, in operations OP4_1-OP4_4, the flying apparatus 1 determines whether there are abnormal direction changes in the magnetic data in a long period of time (e.g., 10 seconds) to determine whether it has been subject to magnetic interference.

It is noted that, compared to the operations OP3_1-OP3_4, the operations OP4_1-OP4_4 determine whether there are deviations among magnetic data in a relatively long time period through similar operations. Therefore, the difference between the operations OP3_1-OP3_4 and the operations OP4_1-OP4_4 lies in the magnetic data, namely, the magnetic data obtained in the operations OP3_1 and OP4_1 correspond to different lengths of time. As to the operations OP4_2-OP4_4, the flying apparatus 1 executes the operations similar with those in the operations OP3_2-OP3_4 based on the data obtained in the operation OP4_1 and determines whether the magnetometer 14 has been subject to magnetic interference within a longer time period. For clarity, the similarities will not be repeated.

Specifically, the processor 12 is further configured to execute the following operations: receiving a plurality of second magnetic data measured in a second time period from the magnetometer, wherein the second time period is longer than the first time period, and the second time period comprises the first time period; calculating a plurality of second orientations corresponding to the magnetic pole based on the second magnetic data; calculating a plurality of second moving directions based on a plurality of second movement records corresponding to the second time period; and comparing the second orientations and the second moving directions to determine whether the magnetometer has been subject to magnetic interference within the second time period.

According to the embodiment above, the flying apparatus 1 provided by the present disclosure is able to detect different interference patterns and further avoids the interference sources.

In some embodiments, before flights or inspections, the flying apparatus 1 also executes a calibration operation to confirm if the magnetometer 14 is functioning properly.

Specifically, the processor 12 is further configured to execute the following operations: calculating a magnetic value interval based on a positioning data of the flying apparatus; executing a calibration operation based on an initial magnetic field data and the magnetic value interval, wherein the magnetometer measures the initial magnetic field data at a time point earlier than the first time period; and in response to the calibration operation not yet completed, not calculating the first orientations.

For example, the processor 12 determines that the flying apparatus 1 is located in Taiwan based on the positioning location of the flying apparatus 1, and the magnetic field intensity in this area is 45 μT, thus the processor 12 taking plus and minus 10 percent of 45 μT as the magnetic value interval (i.e., 40.5-49.5 μT).

Next, the processor 12 confirms whether the magnetic field strength falls within the magnetic value interval. If so, it is indicated that the magnetometer 14 is capable of measure magnetic data normally, and the calibration operation can be completed. It not, it is indicated that there is an abnormality in the magnetic data measured by the magnetometer 14, and further calibrations or examinations for the magnetometer 14 are needed.

Finally, after completing the calibration operation, the flying apparatus 1 may start to perform inspection and detects whether magnetic interference exists simultaneously.

In some embodiments, after determining being subject to magnetic interference, the flying apparatus 1 estimates the position and the range of the interference source based on the magnetic data measured at multiple positions and generates an avoidance route accordingly to avoid the interference source.

Specifically, the avoidance operation comprises: estimating a range and a position of an interference source based on the first magnetic data corresponding to a plurality of positions; and generating an avoidance route based on the range and the position of the interference source to control the flying apparatus to avoid the interference source.

For example, the processor 12 estimates the position of the interference source by the following formula 1 based on the magnetic data measured at multiple positions.

$$B = \frac{\mu_0 I}{2\pi r}, \quad \text{(formula 1).}$$

In formula 1, B is the magnetic field strength (μT), μ0 is vacuum permeability (approximately equal to $4\pi\times10^{-7}$ T·m/A), I is current (ampere), r is the shortest distance between the cable and the flying apparatus 1.

It is noted that, if the interference level at the same position changes constantly so that the magnetic field strength keep changing, it may indicates that the interference source is an alternating current cable (AC cable). Accordingly, the processor 12 then estimates the position of the interference source based on the highest magnetic field variation value.

Additionally, the flying apparatus 1 may preset a possible interference source type corresponding to the flight environment and set the relative parameters accordingly. For example, the average safety current of common high voltage cables with $150^2$ mm and $250^2$ mm diameters is 400 amperes.

In accordance, based on the magnetic data measured at multiple positions, the flying apparatus 1 is able to estimate the position of the interference source.

In some embodiments, if the original route of the flying apparatus 1 is expected to enter the magnetic interference area, the flying apparatus 1 first estimates the position and range of the interference source, and then calculating the avoidance route avoiding the interference source, so as to fly to the expected destination.

Specifically, the operation of the processor 12 generating the avoidance route further comprises: determining a starting point and an end based on an original route; and executing at least one iterative operation to determine at least one route point based on the starting point, the end, and the range and the position of the interference source, wherein each of the at least one route point is iteratively generated based on the starting point or a previous route point, and the avoidance route is composed of the at least one route point connecting the starting point and the end.

Please refer to FIGS. 3A-3D, which are schematic diagrams illustrating the flying apparatus 1 estimating a position and a range of an interference source and generating an avoidance route according to some embodiments of the present disclosure.

Figure 3A:
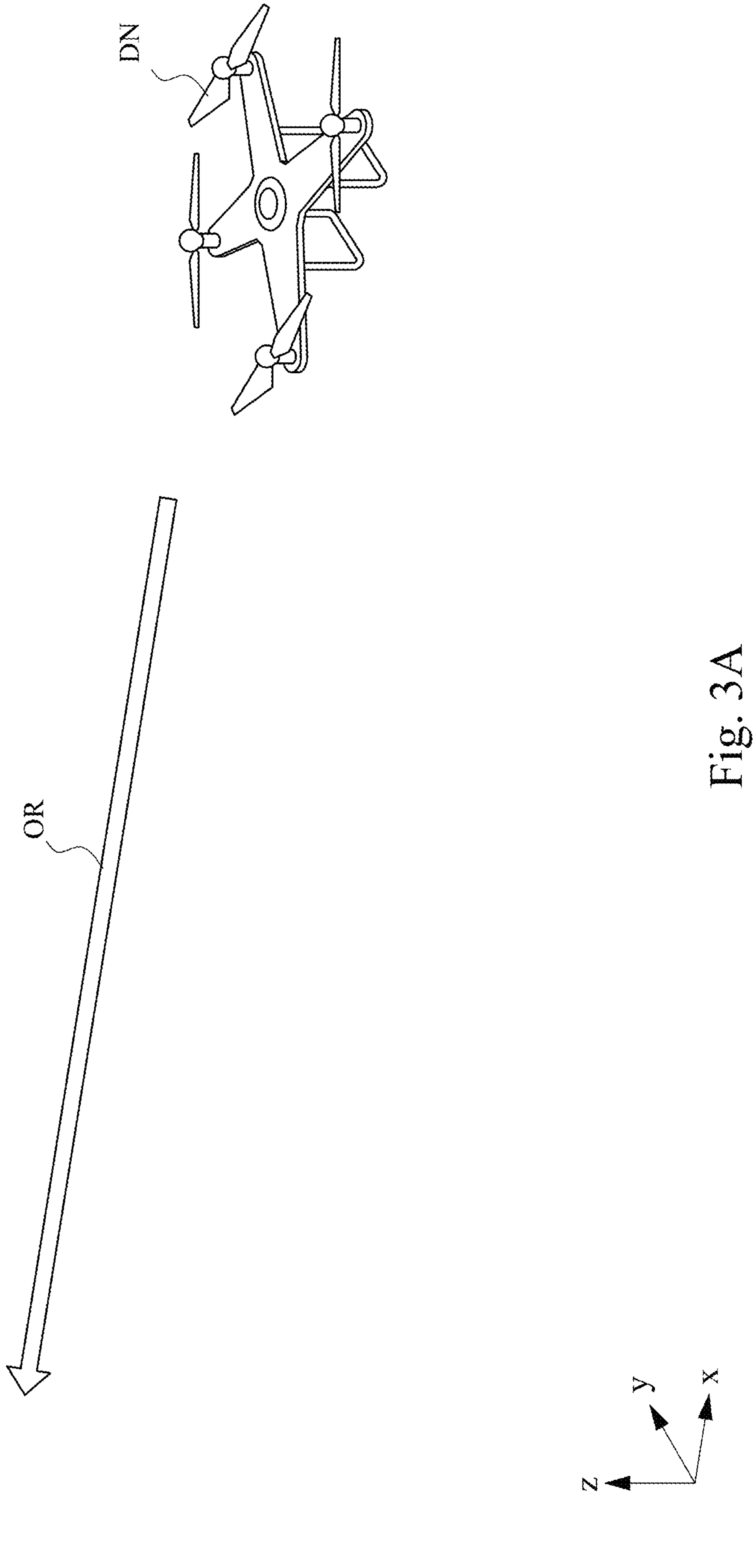
FIG. 3A-3D are schematic diagrams illustrating the flying apparatus estimating a position and a range of an interference source and generating an avoidance route according to some embodiments of the present disclosure.

First, as shown in FIG. 3A, in the three-dimensional space consist of x, y, and z axes, a drone DN (i.e., the flying apparatus 1) flies alone an original route OR.

Figure 3B:
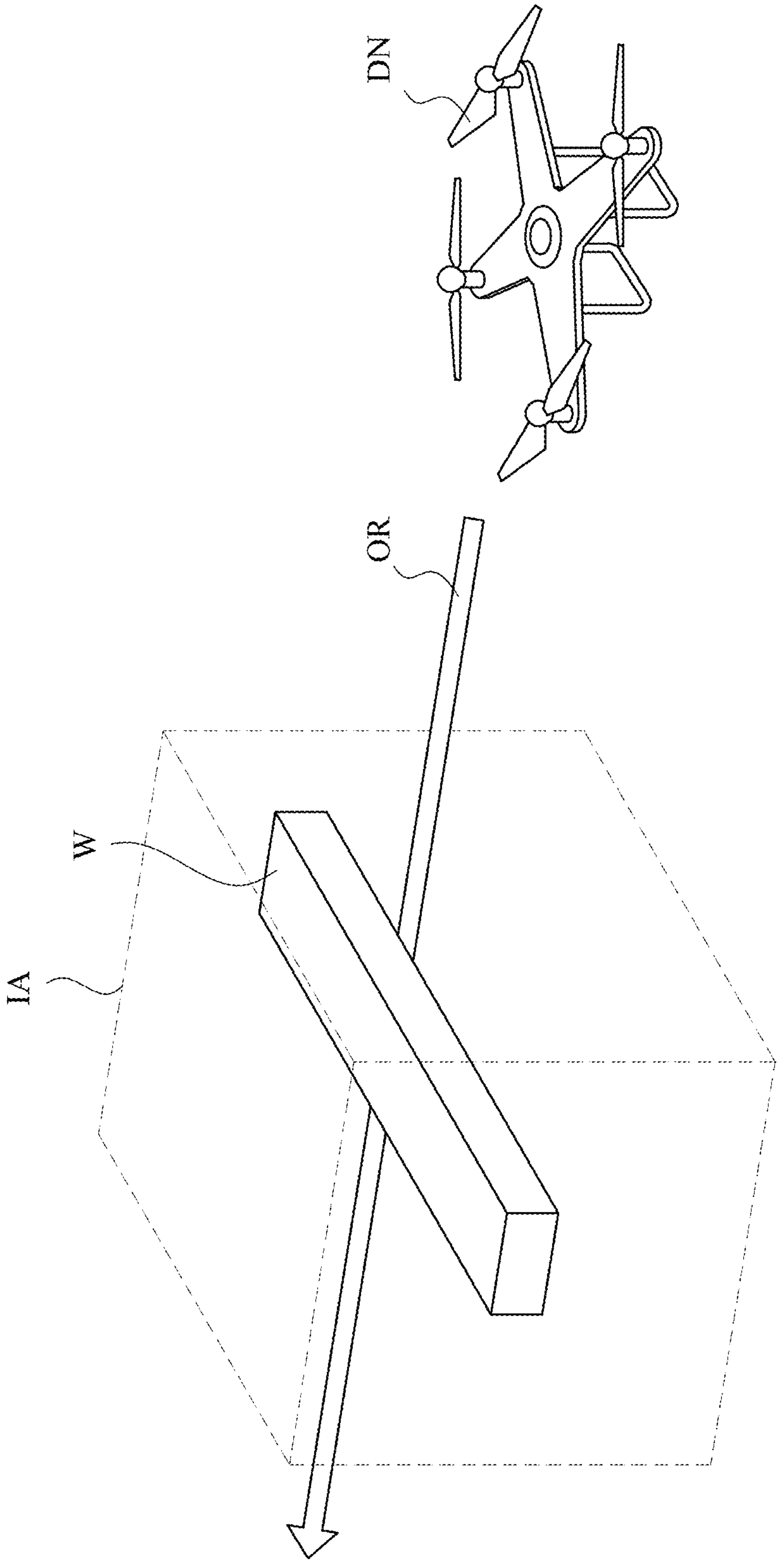
Figure 3B:
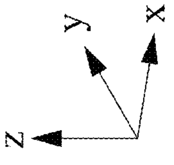

Next, as shown in FIG. 3B, the drone DN detects an interference source W during a flight, the original route OR passes around the interference source W, and the flying apparatus 1 may be subject to severe magnetic interference. In accordance, the drone DN demarcates an interference area IA around the interference source W.

In some embodiments, after estimating the interference source W, the drone DN estimates an area where it will be subject to a certain level of magnetic interference around the interference source W (e.g., the interference level of the magnetic data and/or magnetic field directions being greater than a certain threshold), so as to demarcate the interference area IA.

In some embodiments, the drone DN frames a preset range around the interference source W to demarcate the interference area IA. For example, taking the interference source W as a basis and extending a specific distance along the x, y, and z axes respectively to demarcate the interference area IA.

Figure 3C:
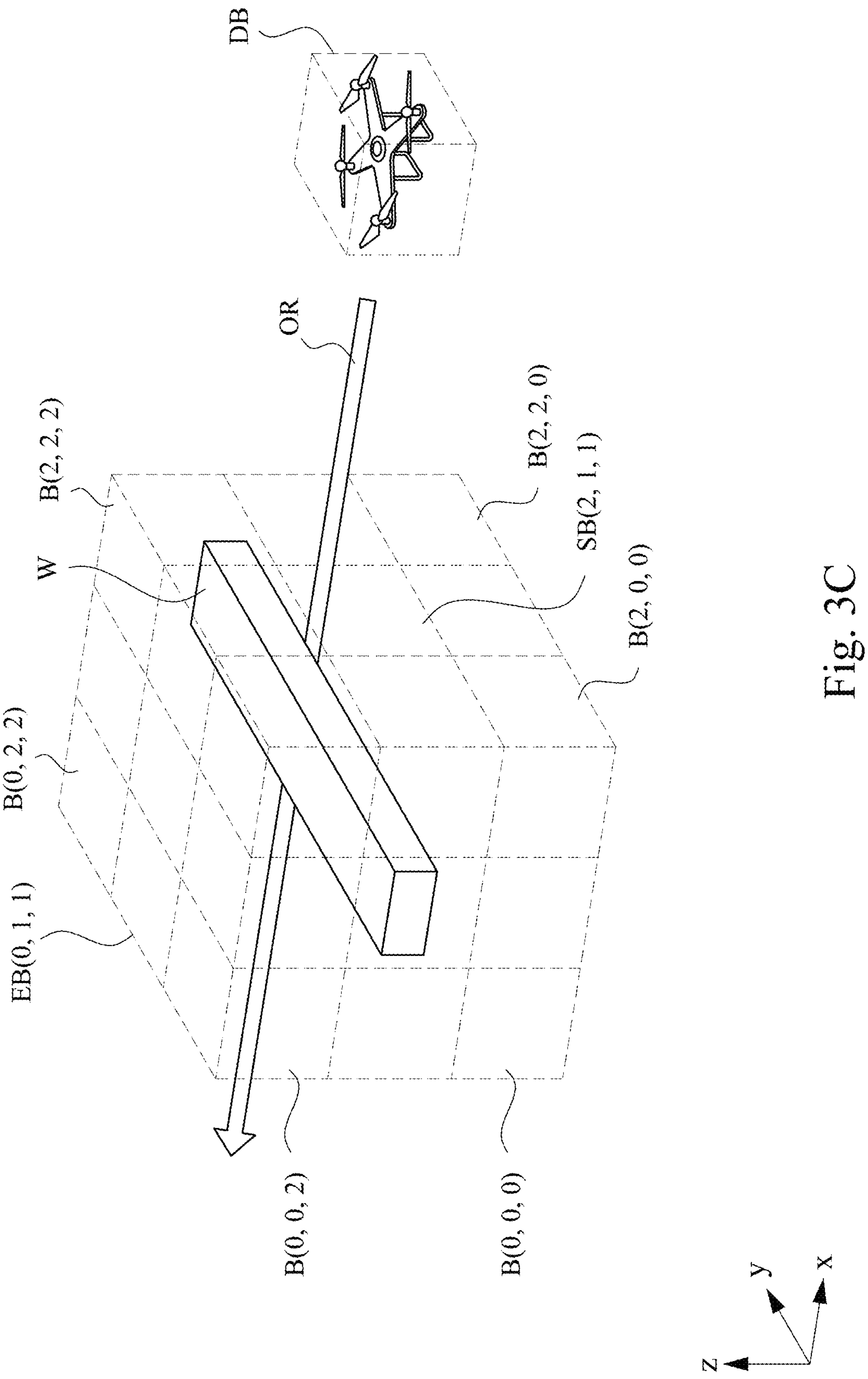

Next, as shown in FIG. 3C, the drone DN further divides the interference area IA into 3*3*3 blocks based on a drone block DB composed of its fuselage and labels the blocks by B(0, 0, 0)-B(2, 2, 2) along the x, y, and z axes respectively, wherein the wheelbase of the drone DN is considered while demarcating the drone block DB. For example, if the longest wheelbase of the drone DN is 40 cm, the size of the drone block DB may be set as 50*50*50 $cm^3$ to reserve safety distances. Accordingly, the interference area IA is divided into 27 blocks with the size of 50*50*50 $cm^3$.

Next, the drone DN labels the blocks where the interference source W located in as interfered blocks, i.e., the blocks B(1, 0, 1), B(1, 1, 1), and B(1, 2, 1), and the other blocks are labeled as non-interfered blocks.

In some embodiments, the drone DN further measures the magnetic data at multiple positions around the interference area IA and estimates the interference level variation of the block around the interfered blocks accordingly.

For example, if the drone DN measures the magnetic data at relatively low positions (with relatively small z-axis coordinate) around the interference area IA, and the interference level of the magnetic data is relatively high. In accordance, the drone DN determines that there may be other interference sources located below the interference source W, and/or the interference level of the interference source W towards the lower blocks is relatively high.

Therefore, the drone DN labels the blocks below the interfered blocks as potentially interfered blocks, i.e., the blocks B(0, 0, 0)-B(2, 2, 0).

Next, the drone DN labels the first non-interfered block where the original route OR intersecting with the interference area IA as starting blocks SB(2, 1, 1) (i.e., the starting point). Correspondingly, the drone DN labels the last non-interfered block where the original route OR intersecting with the interference area IA as ending blocks EB(0, 1, 1) (i.e., the end).

After determining the starting blocks SB and the ending blocks EB, the drone DN starts to perform iterative operations from the starting blocks SB, so as to calculate the next block, wherein the next block is a non-interfered block adjacent to the last block, and compared to other non-interfered blocks, the next block is the nearest block to the ending blocks EB. By analogy, through performing multiple iterative operations until multiple blocks connecting the starting blocks SB and the ending blocks EB are calculated, the avoidance route can be obtained.

Taking FIG. 3C as an example, the avoidance route consists of the following blocks: the starting block SB(2, 1, 1), the blocks B(2, 1, 2), B(1, 1, 2), B(0, 1, 2), and the ending block EB(0, 1, 1).

Figure 3D:
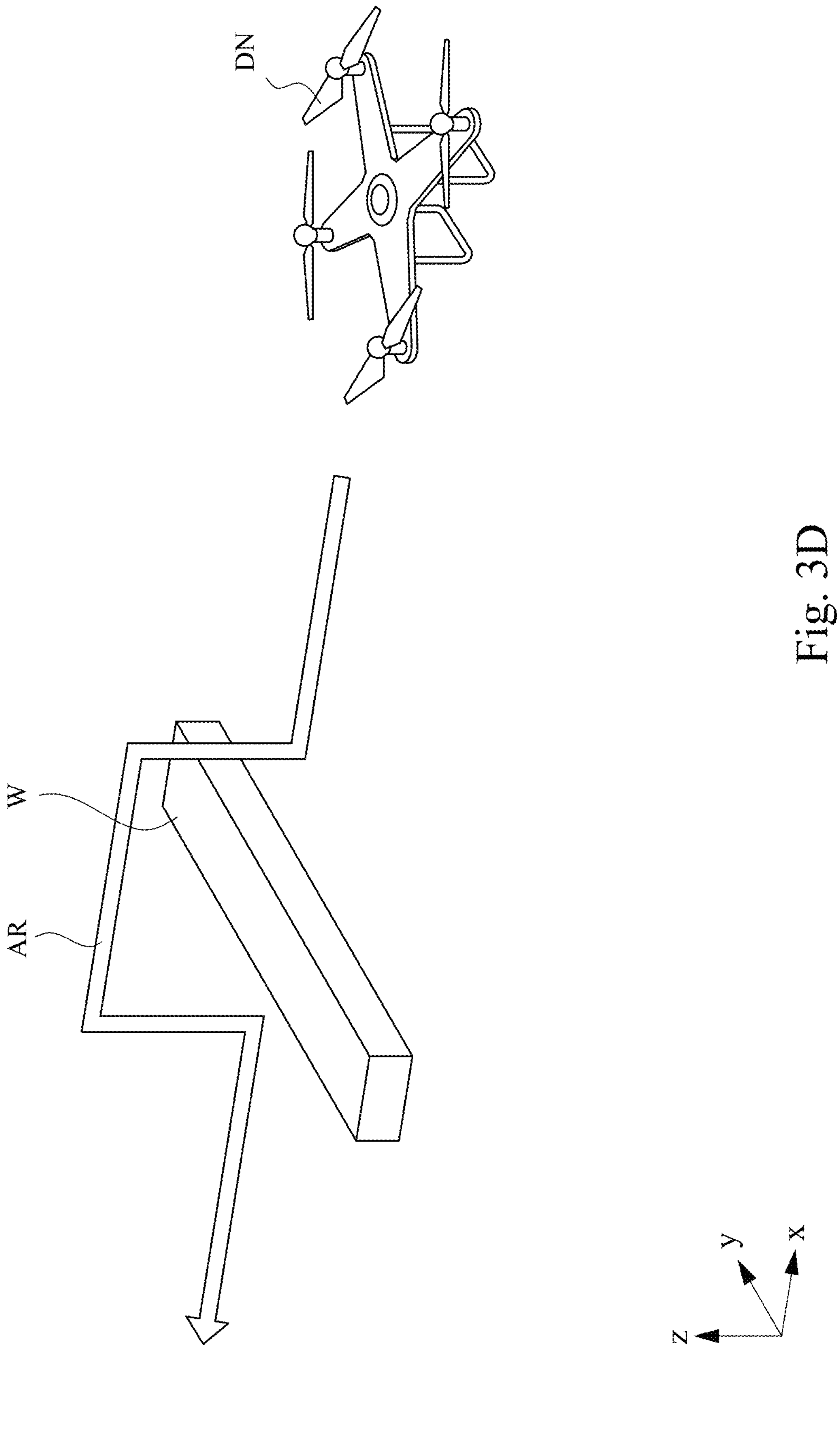

As a result, as shown in FIG. 3D, the drone DN is able to fly along the avoidance route AR, bypass the interference source W, and arrive the destination of the original route OR.

It is noted that, the avoidance route AR may be calculated before the drone DN enters the interference area IA.

In some example, the avoidance route AR is generated through the flowing operations: after entering the interference area IA, the drone DN calculates the next block one by one based on the magnetic data measured at the moment and finally arrives at the ending block.

In another example, the avoidance route AR is calculated before the drone DN enters the interference area IA, and the drone DN adjusts the route based on the magnetic data measured at the moment continuously while flying along the avoidance route AR.

According to the embodiment above, after detecting the interference source, the flying apparatus 1 is able to generate an avoidance route to avoid the interference source and fly to the intended destination. Also, by demarcating blocks larger than the fuselage, the tolerable range of flight error can be increased. By flying along the blocks of the route, the flying apparatus 1 can reduce the risk of deviation from the route due to low positioning precision.

In summary, the flying apparatus 1 provided by the present disclosure is able to determine the risk of magnetic interference in advance and avoid the interference in advance before being severely interfered and causing component failure. Additionally, by using different kinds of examination, the flying apparatus 1 is able to detect different types of magnetic interference. Furthermore, after determining that there is a risk of magnetic interference, the flying apparatus 1 can also estimate the position and range of the interference source and generate an avoidance route accordingly to avoid the interference source and fly to the destination.

Figure 4:
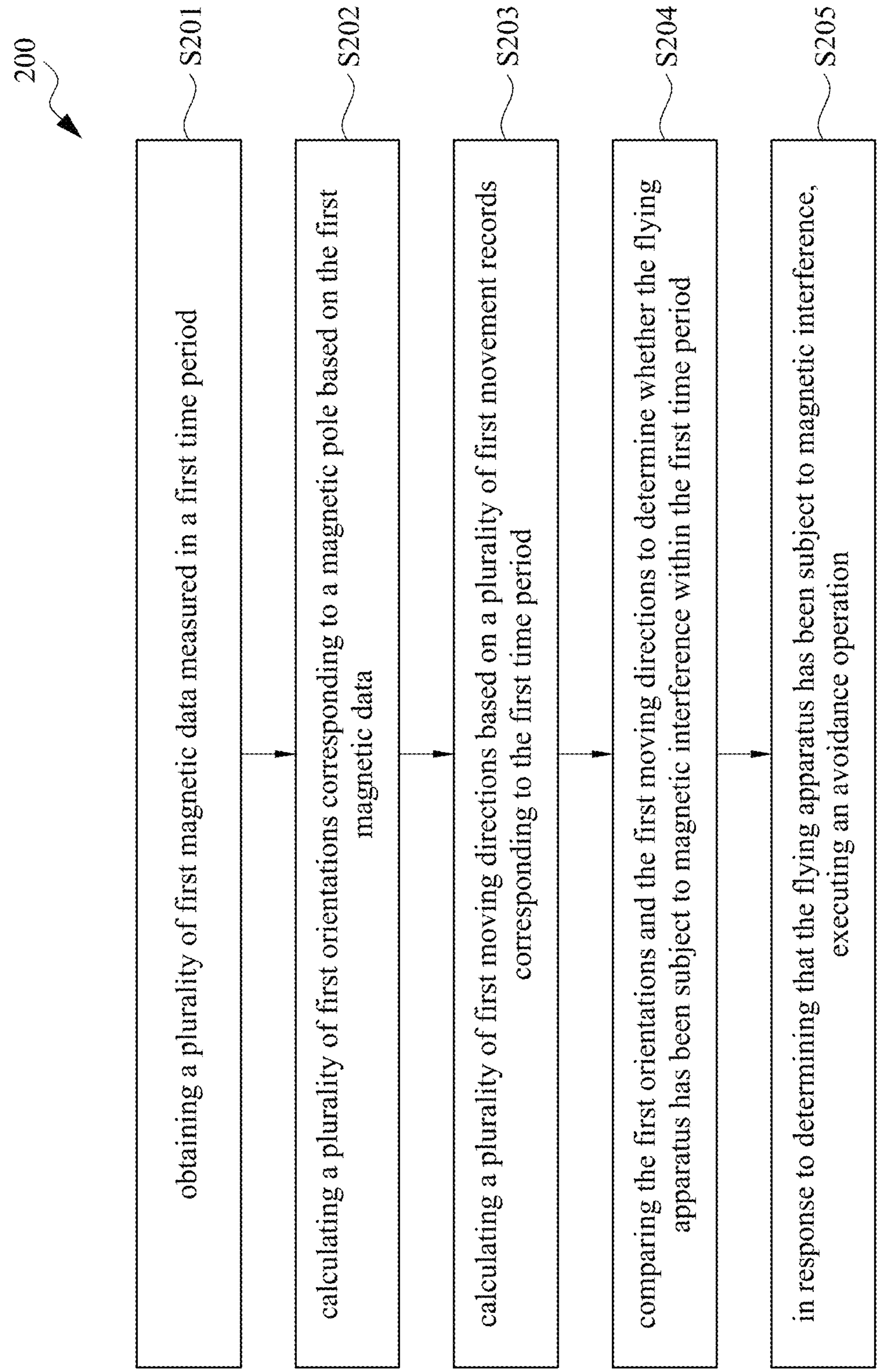
FIG. 4 is a flow diagram illustrating a control method according to a second embodiment of the present disclosure.

Please refer to FIG. 4, which is a flow diagram illustrating a control method according to a second embodiment of the present disclosure. The flying apparatus control method 200 comprises steps S201-S205. The flying apparatus control method 200 is configured to detect whether there is any magnetic interference around and avoid the interference source while flying. The flying apparatus control method 200 can be executed by a flying apparatus (e.g., the flying apparatus 1 in the first embodiment).

First, in the step S201, the flying apparatus obtains a plurality of first magnetic data measured in a first time period.

Next, in the step S202, the flying apparatus calculates a plurality of first orientations corresponding to a magnetic pole based on the first magnetic data.

Next, in the step S203, the flying apparatus calculating a plurality of first moving directions based on a plurality of first movement records corresponding to the first time period.

Next, in the step S204, the flying apparatus compares the first orientations and the first moving directions to determine whether the flying apparatus has been subject to magnetic interference within the first time period.

Finally, in the step S205, in response to determining that the flying apparatus has been subject to magnetic interference, the flying apparatus executes an avoidance operation.

In some embodiments, the step S203 further comprises the flying apparatus calculating the first orientations based on a plurality of first accelerations measured by an accelerometer in the first time period.

In some embodiments, the step S203 further comprises calculating the first orientations based on a plurality of positioning locations measured by a positioning unit in the first time period.

In some embodiments, the step S204 further comprises the flying apparatus calculating a first azimuth difference and a second azimuth difference between the first orientations and the first moving directions corresponding to a first time point and a second time point based on the first time point and the second time point within the first time period; the flying apparatus calculating a first variation between the first azimuth difference and the second azimuth difference; and the flying apparatus determining whether the flying apparatus has been subject to magnetic interference within the first time period based on the first variation.

In some embodiments, the step S204 further comprises in response to the first variation being greater than a second threshold, the flying apparatus calculating a third azimuth difference between the first orientations and the first moving directions corresponding to a third time point based on the third time point within the first time period; the flying apparatus calculating a second variation between the third azimuth difference and the first azimuth difference; and in response to the second variation being greater than the second threshold, the flying apparatus determining that the flying apparatus has been subject to magnetic interference within the first time period.

In some embodiments, the flying apparatus control method 200 further comprises the flying apparatus calculating a magnetic value interval based on a positioning data of the flying apparatus; the flying apparatus executing a calibration operation based on an initial magnetic field data and the magnetic value interval, wherein the flying apparatus measures the initial magnetic field data at a time point earlier than the first time period; and in response to the calibration operation not yet completed, the flying apparatus not calculating the first orientations.

In some embodiments, the flying apparatus control method 200 further comprises the flying apparatus calculating a magnetic difference between one of the first magnetic data and a calibration value, wherein the calibration value is generated based on a positioning data of the flying apparatus; and in response to the magnetic difference being greater than a first threshold, the flying apparatus determining that the flying apparatus has been subject to magnetic interference.

In some embodiments, the flying apparatus control method 200 further comprises the flying apparatus receiving a plurality of second magnetic data measured in a second time period from the flying apparatus, wherein the second time period is longer than the first time period, and the second time period comprises the first time period; the flying apparatus calculating a plurality of second orientations corresponding to the magnetic pole based on the second magnetic data; the flying apparatus calculating a plurality of second moving directions based on a plurality of second movement records corresponding to the second time period; and the flying apparatus comparing the second orientations and the second moving directions to determine whether the flying apparatus has been subject to magnetic interference within the second time period.

In some embodiments, the avoidance operation comprises the flying apparatus estimating a range and a position of an interference source based on the first magnetic data corresponding to a plurality of positions; and the flying apparatus generating an avoidance route based on the range and the position of the interference source to control the flying apparatus to avoid the interference source.

In some embodiments, the step of generating the avoidance route further comprises the flying apparatus determining a starting point and an end based on an original route; and the flying apparatus executing at least one iterative operation to determine at least one route point based on the starting point, the end, and the range and the position of the interference source, wherein each of the at least one route point is iteratively generated based on the starting point or a previous route point, and the avoidance route is composed of the at least one route point connecting the starting point and the end.

In summary, the flying apparatus control method 200 provided by the present disclosure is able to determine the risk of magnetic interference in advance and avoid the interference in advance before being severely interfered and causing component failure. Additionally, by using different kinds of examination, the flying apparatus control method 200 is able to detect different types of magnetic interference. Furthermore, after determining that there is a risk of magnetic interference, the flying apparatus control method 200 can also estimate the position and range of the interference source and generate an avoidance route accordingly to avoid the interference source and fly to the destination.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A control method, being adapted for use in a flying apparatus, wherein the control method comprises the following steps:

obtaining a plurality of first magnetic data measured in a first time period;

calculating a plurality of first orientations corresponding to a magnetic pole based on the first magnetic data;

calculating a plurality of first moving directions based on a plurality of first movement records corresponding to the first time period;

comparing the first orientations and the first moving directions to determine whether the flying apparatus has been subject to magnetic interference within the first time period; and in response to determining that the flying apparatus has been subject to magnetic interference, executing an avoidance operation.

2. The control method of claim 1, wherein the step of calculating the first moving directions further comprises:

calculating the first orientations based on a plurality of first accelerations measured by an accelerometer in the first time period.

3. The control method of claim 1, wherein the step of calculating the first moving directions further comprises:

calculating the first orientations based on a plurality of positioning locations measured by a positioning unit in the first time period.

4. The control method of claim 1, wherein the step of comparing the first orientations and the first moving directions further comprises:

calculating a first azimuth difference and a second azimuth difference between the first orientations and the first moving directions corresponding to a first time point and a second time point based on the first time point and the second time point within the first time period;

calculating a first variation between the first azimuth difference and the second azimuth difference; and determining whether the flying apparatus has been subject to magnetic interference within the first time period based on the first variation.

5. The control method of claim 4, wherein the step of comparing the first orientations and the first moving directions further comprises:

in response to the first variation being greater than a second threshold, calculating a third azimuth difference between the first orientations and the first moving directions corresponding to a third time point based on the third time point within the first time period;

calculating a second variation between the third azimuth difference and the first azimuth difference; and in response to the second variation being greater than the second threshold, determining that the flying apparatus has been subject to magnetic interference within the first time period.

6. The control method of claim 1, further comprising:

calculating a magnetic value interval based on a positioning data of the flying apparatus;

executing a calibration operation based on an initial magnetic field data and the magnetic value interval, wherein the flying apparatus measures the initial magnetic field data at a time point earlier than the first time period; and in response to the calibration operation not yet completed, not calculating the first orientations.

7. The control method of claim 1, further comprising:

calculating a magnetic difference between one of the first magnetic data and a calibration value, wherein the calibration value is generated based on a positioning data of the flying apparatus; and in response to the magnetic difference being greater than a first threshold, determining that the flying apparatus has been subject to magnetic interference.

8. The control method of claim 1, further comprising:

receiving a plurality of second magnetic data measured in a second time period from the flying apparatus, wherein the second time period is longer than the first time period, and the second time period comprises the first time period;

calculating a plurality of second orientations corresponding to the magnetic pole based on the second magnetic data;

calculating a plurality of second moving directions based on a plurality of second movement records corresponding to the second time period; and comparing the second orientations and the second moving directions to determine whether the flying apparatus has been subject to magnetic interference within the second time period.

9. The control method of claim 1, wherein the avoidance operation comprises:

estimating a range and a position of an interference source based on the first magnetic data corresponding to a plurality of positions; and generating an avoidance route based on the range and the position of the interference source to control the flying apparatus to avoid the interference source.

10. The control method of claim 9, wherein the step of generating the avoidance route further comprises:

determining a starting point and an end based on an original route; and executing at least one iterative operation to determine at least one route point based on the starting point, the end, and the range and the position of the interference source, wherein each of the at least one route point is iteratively generated based on the starting point or a previous route point, and the avoidance route is composed of the at least one route point connecting the starting point and the end.

11. A flying apparatus, comprising:

a magnetometer; and a processor, electrically connected to the magnetometer, configured to execute the following operations:

receiving a plurality of first magnetic data measured in a first time period from the magnetometer;

calculating a plurality of first orientations corresponding to a magnetic pole based on the first magnetic data;

calculating a plurality of first moving directions based on a plurality of first movement records corresponding to the first time period;

comparing the first orientations and the first moving directions to determine whether the magnetometer has been subject to magnetic interference within the first time period; and in response to determining that the magnetometer has been subject to magnetic interference, executing an avoidance operation.

12. The flying apparatus of claim 11, wherein the operation of calculating the first orientations further comprises:

calculating the first orientations based on a plurality of first accelerations measured by an accelerometer in the first time period.

13. The flying apparatus of claim 11, wherein the operation of calculating the first orientations further comprises:

calculating the first orientations based on a plurality of positioning locations measured by a positioning unit in the first time period.

14. The flying apparatus of claim 11, wherein the operation of comparing the first orientations and the first moving directions further comprises:

calculating a first azimuth difference and a second azimuth difference between the first orientations and the first moving directions corresponding to a first time point and a second time point based on the first time point and the second time point within the first time period;

calculating a first variation between the first azimuth difference and the second azimuth difference; and determining whether the magnetometer has been subject to magnetic interference within the first time period based on the first variation.

15. The flying apparatus of claim 14, wherein the operation of comparing the first orientations and the first moving directions further comprises:

in response to the first variation being greater than a second threshold, calculating a third azimuth difference between the first orientations and the first moving directions corresponding to a third time point based on the third time point within the first time period;

calculating a second variation between the third azimuth difference and the first azimuth difference; and in response to the second variation being greater than the second threshold, determining that the magnetometer has been subject to magnetic interference within the first time period.

16. The flying apparatus of claim 11, wherein the processor is further configured to execute the following operations:

calculating a magnetic value interval based on a positioning data of the flying apparatus;

executing a calibration operation based on an initial magnetic field data and the magnetic value interval, wherein the magnetometer measures the initial magnetic field data at a time point earlier than the first time period; and in response to the calibration operation not yet completed, not calculating the first orientations.

17. The flying apparatus of claim 11, wherein the processor is further configured to execute the following operations:

calculating a magnetic difference between one of the first magnetic data and a calibration value, wherein the calibration value is generated based on a positioning data of the flying apparatus; and in response to the magnetic difference being greater than a first threshold, determining that the magnetometer has been subject to magnetic interference.

18. The flying apparatus of claim 11, wherein the processor is further configured to execute the following operations:

receiving a plurality of second magnetic data measured in a second time period from the magnetometer, wherein the second time period is longer than the first time period, and the second time period comprises the first time period;

calculating a plurality of second orientations corresponding to the magnetic pole based on the second magnetic data;

calculating a plurality of second moving directions based on a plurality of second movement records corresponding to the second time period; and comparing the second orientations and the second moving directions to determine whether the magnetometer has been subject to magnetic interference within the second time period.

19. The flying apparatus of claim 11, wherein the avoidance operation comprises:

estimating a range and a position of an interference source based on the first magnetic data corresponding to a plurality of positions; and generating an avoidance route based on the range and the position of the interference source to control the flying apparatus to avoid the interference source.

20. The flying apparatus of claim 19, wherein the operation of generating the avoidance route further comprises:

determining a starting point and an end based on an original route; and executing at least one iterative operation to determine at least one route point based on the starting point, the end, and the range and the position of the interference source, wherein each of the at least one route point is iteratively generated based on the starting point or a previous route point, and the avoidance route is composed of the at least one route point connecting the starting point and the end.

* * * * *